Nov. 9, 1948.  C. E. BOGARDUS  2,453,403
WIND BREAKER FOR PARKED AIRCRAFT
Filed July 3, 1946
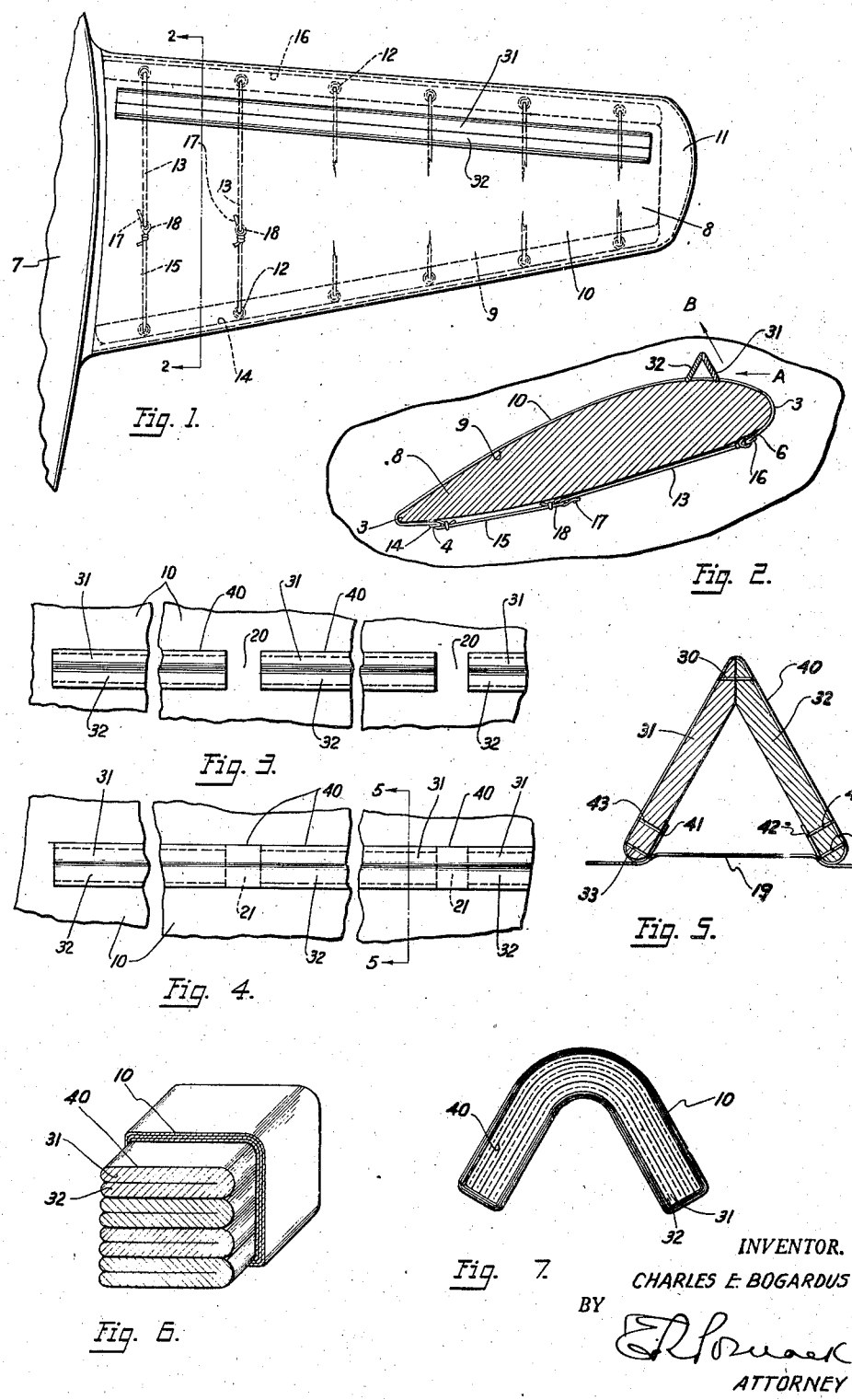
INVENTOR.
CHARLES E. BOGARDUS
BY
ATTORNEY Patented Nov. 9, 1948

2,453,403

UNITED STATES PATENT OFFICE 2,453,403

WINDBREAKER FOR PARKED AIRCRAFT

Charles E. Bogardus, New Rochelle, N. Y.

Application July 3, 1946, Serial No. 681,370

7 Claims. (Cl. 244—40)

This invention relates to means—which will be referred to herein as a "wind breaker"—associated with the wings of aeroplanes parked in landing fields or other open spaces. The object of the wind breaker is to prevent bouncing or alternate lifting and dropping of the parked aeroplane caused by the action of wind upon the airfoil surfaces of the wings.

Aeroplanes parked for temporary intervals or for longer periods or stored for more extended times on landing fields, open hangars or other open spaces are subjected to the action of winds that sweep across such open spaces. Because of the perfect airfoil surfaces presented by the wings, even light breezes tend to lift the parked machine. Parked aircraft are usually snubbed down by a stout wire or cord at each wing and hooked or otherwise attached to the underside of the wing at a point nearer to the fuselage than to the wing tip, for example, at the juncture of the fuselage brace and the underside of the wing. The other end of the snubber line is secured to a post or block anchored in the ground. In some cases a winch or other arrangement is provided at the anchor block to adjust the length of the snubber line for different types and sizes of aircraft.

The snubber line is never made tight or taut, but is sufficiently long so that a certain amount of slack is always present in the line. The reason for this is that a sudden gust of wind or a wind of high velocity might lift the machine with sufficient force to injure or weaken the wing structure or other parts of the aeroplane or even cause a fracture therein. As a result of the slackness of the snubber line, the parked aircraft is continuously bounced up and down with a frequency and severity depending upon wind conditions. Such repeated and often violent bouncing has a harmful effect on the parked aeroplane in that it causes more or less heavy stresses and vibrations to be set up in the wings and other parts of the plane. These stresses and vibrations, and especially the stress-repetition caused by the frequency of alternate lifting and dropping of the parked aircraft, result in needless wear of the affected parts, a shortened life of the machine and other harmful consequences. This harmful effect of providing slackness in the snubber line has been recognized, but is considered as the lesser of two evils, since a taut snubber securement might result in a severe injury, especially to the wing (and might be disastrous if the injury is not discovered before the machine is in flight).

One of the principal objects of this invention is to provide means to be associated with the wings of an aeroplane parked in an open field and snubbed down, for preventing the aforesaid bouncing of the machine under the action of wind upon the wings thereof. An allied object is to provide means as described which will eliminate the lifting effect of the wind on the airfoil wing surface of the parked aircraft.

The wings of aircraft parked in airfields or other open spaces are usually provided with a cover of light fabric which is spread over the top surface of the wing including the leading and trailing edge of the wing. The wing cover thus extends from a point on the underside of the wing near its leading edge, over the top wing surface, to a point on the underside of the wing near its trailing edge. The cover is held in place by a plurality of cords spaced along the length of the wing and disposed on the underside of the wing, each cord extending between the aforesaid two terminal points of the cover.

Another important object of the invention is to provide an aeroplane wing cover implemented with wind breaking means as described. An allied object is to associate wind breaking means with a wing cover so that the said means may be readily applied and removed from an aeroplane wing, so that the wind breaking means will be disposed in the proper position (more fully described below) on the wing, and so that it will be maintained securely in this position and will not be shifted by the force of the wind.

A further object of the invention is to provide a wing cover having wind breaking means which is light in weight and easy to handle and store. A still further object is to provide a wing cover having wind breaking means, so devised as to permit the cover to be folded at spaced points along its length and rolled about the wind breaking means into a compact bundle of small size easy to carry and store. An allied object is to implement a wing cover with flexible wind breaking means to enable the said compact bundle of cover and wind breaking means to be flexed for storing in a confined space.

For the attainment of the foregoing and such other objects of invention as may appear or be pointed out herein I have shown several embodiments of my invention in the accompanying drawing, wherein:

Figure 1 is a top view of an aeroplane wing showing one form of improved wind breaker and wing cover;

Figure 2 is a section through the wing on the line 2—2 of Figure 1;

Figure 3 is a top view of a fragment of improved wing cover and wind breaker, on enlarged scale, showing a slightly modified form;

Figure 4 is a top view similar to Figure 3 but showing a modified form;

Figure 5 is a section, on further enlarged scale, taken on the line 5—5 of Figure 4;

Figure 6 is a perspective view of the improved wing cover and wind breaker folded in a compact package, the folds of the wing cover forming the outer confines of the package being broken away; and Figure 7 is a plan view of the package of Figure 6 shown in a flexed condition for storing in a confined space.

Referring to Figures 1 and 2, the cover 10 of vinyl resin fabric or other suitable material is commonly employed to cover the top surface 9 of the wings, such as wing 8, of an aeroplane (a fragment of its fuselage being designated 7) parked and snubbed-down on an airfield as described hereinabove. Cover 10 extends from a point close to the fuselage 7, Figure 1, to the tip end of the wing where it terminates in a cap or pocket 11 which fits over the tip end of the wing. One longitudinal edge of cover 10 is disposed at a point 6, Figure 2, on the underside of the wing near its leading edge 5 and the other longitudinal edge is disposed at a point 4, also on the underside of the wing, near its trailing edge 3; cover 10 thus effectively encompasses top surface 9, leading edge 5 and trailing edge 3, as well as the tip of the wing encased in pocket 11. The longitudinal edges of the cover at 4, 6 are reinforced by thickened edge portions, respectively, 14 and 16, which are pierced at spaced points by grommets 12. The grommets 12 of reinforced edges 14, 16 are in transverse alignment, Figure 1, at spaced points longitudinally of the cover. Cover 10 is held securely in place on the wing by means of cords 13, 15, at each of the longitudinally spaced points, stretched between the aligned grommets at these points. One of the cords, such as 13, is secured at one end to the grommets of one reinforced cover edge, such as 16, while the other cord 15 is secured at one end to the grommets of the other reinforced edge 14. The free ends of cords 13, 15 are secured together in any suitable manner, as by a loop 18 provided at the end of cord 15, the free end of cord 13 being passed through loop 18 and folded back and held by a snap fastener 17. Cover 10 and its cords 13, 15 thus effectively maintain the cover stretched securely in place on the wing, the cords being pulled tight to fasten their ends together, so that the cover is held against shifting transversely of the wing.

The wind breaking means comprises a pair of slats 31, 32, Figure 5, inclined towards one another to form an inverted V with the top edges of the slats abutting to form the apex and with their lower edges spread apart to provide a wide base. I have obtained satisfactory results by using slats 2" wide and of a thickness depending upon the slat material. I prefer to use cotton webbing for the slats, in which case the slat thickness is about 3/8". Satisfactory results have been obtained by inclining the slats so that they form an apex angle of approximately 30°. It will be understood that the foregoing dimensions, material and angle are given merely by way of example to explain the invention, which is not restricted in scope or practice to the stated particulars. One advantage of using slats of cotton webbing is that the upper edges may be conveniently secured together to form the apex, as by sewing them together by stitching 30. Also, a cover 40, preferably of the same fabric material as wing cover 10, may be readily sewed to the slats, and, finally, the slats may be readily secured to the wing cover 10 by sewing, as will be seen.

Slat cover 40 extends over the apex and outer surfaces of inclined slats 31, 32 and is folded inwardly over the lower edges of the slats to form inner borders 41, 42. Slat covers 40 is sewed to the slats by stitching 43 at the lower portion of slat 31 between cover 40 and its inner border 41 and by stitching 44 at the lower portion of the other slat 32 between cover 40 and its inner border 42. The pair of united slats 31, 32, together with slat cover 40, are secured to wing cover 10 by stitching 33 at the lower edge of slat 31 between slat cover 40, slat 31, inner border 41 and wing cover 10 and by stitching 34 at the lower edge of slat 32 between slat cover 40, slat 32, inner border 42 and wing cover 10. The stitching 33, 34 are at spaced points, Figure 5, of wing cover 10 so that a strip 19 of wing cover fabric of predetermined width is disposed between the lower edges of the slats. When the wing cover is stretched over the wing and pulled tightly to fasten together the ends of the series of cords 13, 15 (as described above), the wing cover will pull or spread the lower edges of the slats outwardly or apart to an extent limited by the said strip 19 of wing cover fabric. Wing cover 10 is stretched and tensioned so that the pair of united slats are firmly maintained in the form of an inverted V, the base of which is predetermined by the width of strip 19 of the wing cover, and the slats are inclined at a predetermined angle.

When cover 10 is properly stretched over the wing, as in Figure 2, the slats 31, 32 will be disposed on the upper surface of the wing at, or close to, the point thereof which is the highest point of the airfoil surface; this point may be spaced from leading edge 5 a distance of between 5% to 10% of the length of the maximum chord (from leading edge 5 to trailing edge 3). In this position of the slats on the wing of a snubbed-down aeroplane, shown in Figure 2, one of the slats, 31, as shown in Figure 2, presents a deflecting surface to the wind approaching the leading edge 5 (indicated by arrow $a$). Slat 31 deflects the on-rushing wind (arrow $a$) upwardly, as indicated by arrow $b$, and thus prevents the wind from continuing along the upper airfoil surface of the wing. By thus keeping the flow of air out of contact with the airfoil surface, the creation of a low pressure area above the top of the wing is thwarted; consequently the creation of an upward lift upon the wing is prevented.

The slats 31, 32 and slat cover 40 may extend the length of the wing, as in Figure 1, or the slats 31, 32 and slat cover 40 may be discontinuous at spaced points along the length of the wing, as in Figure 3, where the ends of adjacent slats and slat covers are separated by a short distance 20, Figure 3. In Figure 4, the slat cover 40 extends the length of wing cover 10, but the slats 31, 32 are discontinuous at spaced points along the length of the slat cover, the ends of adjacent slats being separated a short distance 21. The distance (20, Figure 3; 21, Figure 4) between slats is made sufficiently wide to enable the wing cover 10 to be folded at these points into a bundle somewhat longer than the length of the slats. This bundle is made more compact and regular, and the folding thereof facilitated, by reason of the fact that the slats 31, 32, Figure 5, may be brought into close contact with their inner sides in abutting relation; this is made possible by the facts that the upper edges of the slats are hingedly secured together by the stitch 30 and their lower edges are sewed to the limpid fabric of wing cover 10. The compact bundle is illustrated in Figure 6. Another advantage of using cotton webbing for the slats is that such slats would have sufficient flexibility to enable the said bundle to be flex, as illustrated in Figure 7, to enable the flexed bundle to be stored in a confined space.

In the above description, the invention has been disclosed merely by way of example and in preferred manner; but obviously many variations and modifications may be made therein which will still be comprised within its spirit. It is to be understood, therefore, that the invention is not limited to any specific form or manner of practicing same, except in so far as such limitations are specified in the appended claims.

I claim:

1. A device for eliminating the lifting action of wind upon the wings of a snubbed-down aeroplane comprising a cover adapted to be attached to a wing in overlying relation to its upper surface and a pair of slats inclined towards one another to form an inverted V, the upper edges of the slats being secured together in abutting relation to form the apex, and the lower edges of the slats being secured to the said wing cover in spread apart relation to dispose the slats in upright position at the upper surface of the wing.

2. A device for eliminating the lifting action of wind upon the wings of a snubbed-down aeroplane comprising a cover attached to a wing in overlying relation to its upper surface, at least one slat adapted to be disposed at the upper surface of the wing to present a deflecting surface to the wind, and a cover for the said slat secured to the said wing cover, the said wing cover being of fabric material and the said slat and slat cover being discontinuous at spaced points along the length of the wing, whereby the wing cover is foldable at said spaced points.

3. A device for eliminating the lifting action of wind upon the wings of a snubbed-down aeroplane comprising a cover attached to a wing in overlying relation to its upper surface, at least one slat adapted to be disposed at the upper surface of the wing to present a deflecting surface to the wind, and a cover for the said slat secured to the said wing cover, the said wing cover and slat cover being of fabric material and the said slat being discontinuous, the said wing cover and slats being folded into a compact bundle, the said slats being of flexible material whereby the said bundle may be flexed for storing in a confined space.

4. A device for eliminating the lifting action of wind upon the wings of a snubbed-down aeroplane comprising a fabric cover adapted to be stretched over the upper surface of a wing and a pair of slats of cotton webbing, the upper edges of the slats being sewed together and the lower edges of the slats being sewed to the said wing cover in spread apart relation to dispose the slats in the form of an inverted V at the upper surface of the wing.

5. A device for eliminating the lifting action of wind upon the wings of a snubbed-down aeroplane comprising a fabric cover adapted to be stretched over the upper surface of a wing and a pair of slats of cotton webbing, the upper edges of the slats being sewed together and the lower edges of the slats being sewed to the said wing cover at points thereof spaced to provide a strip of wing cover fabric of predetermined width between said points of slat securement, whereby the said pair of slats will be maintained at the upper wing surface in the form of an inverted V to present a wind deflecting surface inclined at a predetermined angle.

6. A device for eliminating the lifting action of wind upon the wings of a snubbed-down aeroplane comprising a fabric cover adapted to be stretched over the upper surface of a wing and a pair of slats of cotton webbing, the upper edges of the slats being sewed together, a fabric cover for the slats, said slat cover encompassing at least the upper edges and outer surfaces of the said slats, the lower edges of the slats and slat cover being sewed to the said wing cover in spread apart relation to dispose the slats in the form of an inverted V encompassed by the said slat cover, at the upper surface of the wing.

7. A device for eliminating the lifting action of wind upon the wings of a snubbed-down aeroplane comprising a fabric cover for the wings, and a pair of slats adapted to present a deflecting surface at the upper portion of the wing, said slats being secured to the wing cover along their lower edges, the upper edges of the slats being hingedly united whereby the said pair of slats may be brought into abutting relation to present a compacted surface for storing.

CHARLES E. BOGARDUS.

REFERENCES CITED

The following references are of record in the file of this patent:

Technical Notes, National Advisory Committee for Aeronautics, No. 801, published Washington, D. C., March 1941.